United States Patent [19]

Noguchi et al.

[11] Patent Number: 5,952,414
[45] Date of Patent: Sep. 14, 1999

[54] INK, AND A COLOR INK-JET RECORDING METHOD USING THE SAME

[75] Inventors: Hiromichi Noguchi, Hachioji; Masanori Takenouchi, Yokohama; Masako Shimomura, Yokohama; Masashi Miyagawa, Yokohama, all of Japan

[73] Assignee: Canon Kabushiki Kaisha, Tokyo, Japan

[21] Appl. No.: 08/733,322

[22] Filed: Oct. 17, 1996

[30] Foreign Application Priority Data

Oct. 20, 1995 [JP] Japan .................................. 7-295998

[51] Int. Cl.⁶ ........................................................ C08K 5/13
[52] U.S. Cl. ............................ 524/377; 523/161; 524/265
[58] Field of Search ..................... 524/265, 377; 523/161

[56] References Cited

U.S. PATENT DOCUMENTS

| | | | |
|---|---|---|---|
| 4,411,668 | 10/1983 | Agarwal | 8/527 |
| 5,160,370 | 11/1992 | Suga et al. | 106/20 |
| 5,172,133 | 12/1992 | Suga et al. | 346/1.1 |
| 5,184,148 | 2/1993 | Suga et al. | 346/1.1 |
| 5,211,747 | 5/1993 | Breton | 106/20 |
| 5,229,786 | 7/1993 | Suga et al. | 346/1.1 |
| 5,284,894 | 2/1994 | Wasyliw | 524/377 |
| 5,324,354 | 6/1994 | Jesse | 106/413 |
| 5,354,369 | 10/1994 | Shimomura et al. | 106/22 H |
| 5,382,283 | 1/1995 | Yui et al. | 106/22 R |
| 5,409,529 | 4/1995 | Nagashima et al. | 106/22 H |
| 5,441,561 | 8/1995 | Chujo | 106/20 |

FOREIGN PATENT DOCUMENTS

| | | |
|---|---|---|
| 250271A2 | 12/1987 | European Pat. Off. . |
| 592774A2 | 4/1994 | European Pat. Off. . |

*Primary Examiner*—Paul R. Michl
*Attorney, Agent, or Firm*—Fitzpatrick, Cella, Harper & Scinto

[57] ABSTRACT

Provided is an ink, having a surface tension of not less than 30 mN/m and a viscosity of not more than 5 mpa•s, and comprising a water-soluble dye, water, at least one compound selected from the Compound Groups A and B, and at least one compound selected from the Compound Group C.

14 Claims, No Drawings

INK, AND A COLOR INK-JET RECORDING METHOD USING THE SAME

BACKGROUND OF THE INVENTION

1. Field of the Invention

The present invention relates to an ink composition (hereafter referred to simply as "ink") which can achieve both high-precise color images and reliability, and to a color ink-jet recording method for conducting a recording making use of the aforementioned ink.

2. Related Background Art

In recent years, the aspects of lowering running costs in ink-jet printers and also reducing the amount of refuse produced thereby have called for a type of recording apparatus in which an ink tank is set separate from a printing head, so that the ink tank alone can be replaced. Such apparatus have already been utilized to a certain extent.

However, it has been found that, in a recording apparatus in which only the ink tank is replaced, problems may occur as follows: Namely, air exists in nozzles and ink passages of the ink tank when it is replaced. And therefore, there may occur an inconvenience that such air may remain in the tank, in the form of bubbles, when a new ink is set thereto. Particularly, with ink-jet recording systems which use pressure pulses as the force for forming droplets, the bubbles which remain fixed within the ink will cause serious problems on a subsequent droplet formation.

Moreover, development of high-density printing heads for color ink-Jet recording apparatus has progressed so that devices capable of high-quality printing have been prepared. However, there are problems with the ink to be used in such devices, since increasingly smaller droplets of ink (in a range of 3 to 50 picoliters per droplet) must be ejected in a stable and controlled manner at high frequencies, in order to conduct high-quality recording, which presents a problem in dynamics. Further, there is a problem with the reliability of such ink, as the ink must not plug up nozzles, nor remain as a residue on a surface of nozzles, and must be able to be controlled at an increasingly higher level in the apparatus.

Solving such problems can never be hoped for if ink material development is only conducted as an extension of past ink material design, while the devices themselves are being designed and provided with functions for high-quality recording. It is necessary to combine various constituent materials having various functions, in a highly skilled manner, in order to provide for an ink which satisfies the various properties required therefor. Specifically, selection and combination of various materials such as substances for protecting nozzles from clogging by an ink (evaporation prevention), solvents for maintaining an ink at low viscosity and for maintaining a long term stability of solution, solvents capable of dissolving dyes in the ink, anti-foaming agents, and the like, are extremely important.

SUMMARY OF THE INVENTION

Accordingly, it is an object of the present invention to provide an ink which does not easily allow for trouble within a color ink-Jet recording apparatus such as a foaming-up of ink or an air inclusion in the ink, and therefore, to provide an ink which can be supplied stably to nozzles, further which has a good balance between penetration into the recording paper and feathering, which has stable ejection properties so as to allow to form stably a formation of droplets even when dealing with a small droplet formation, moreover which does not easily cause clogging of nozzles, and thus which is capable of performing a high-quality recording.

Another object of the present invention is to provide a color ink-jet recording method which is not only capable of providing high-quality color images, but also has excellent reliability.

The objects of the present invention can be achieved by the present invention. According to the present invention there is provided an ink, having a surface tension of not less than 30 mN/m and a viscosity of not more than 5 mpa•s, and comprising a water-soluble dye, water, at least one compound selected from the Compound Groups A and B, and at least one compound selected from the Compound Group C:

Compound Group A:

A-1: Ethylene glycol mono-n-butyl ether (adhesive tension: −34.3),

A-2: Ethylene glycol monophenyl ether (adhesive tension: −31.9),

A-3: Ethylene glycol monoisobutyl ether (adhesive tension: −32.5),

A-4: Diethylene glycol mono-n-butyl ether (adhesive tension: −32.3),

A-5: Diethylene glycol monohexyl ether (adhesive tension: −31.7),

A-6: Diethylene glycol monoisobutyl ether (adhesive tension: −32.5),

A-7: Triethylene glycol n-butyl ether (adhesive tension: −24.5),

A-8: Dipropylene glycol monopropyl ether (adhesive tension: −24.0), and

A-9: Ethylene oxide adduct of benzyl alcohol (adhesive tension: −20.0).

Adhesive tension is measured in units of mN/m.

Data of the adhesive tensions of the compounds of Compound Group A measured by a dynamic wettability tester are shown above. The adhesive tension has the same meaning as the dynamic contact angle of contact. These figures represent an adhesive tension 5 seconds after the test mixture of 10% by weight of a glycol ether among the compounds of Compound Group A at 10% by weight, 0.5% by weight of a dye added only for discrimination and a balance of water in contact with paper for PPC under ordinary temperature and humidity. The greater the negative value, the greater the wettability is in a short time.

Compound Group B:

B-1: Surface active agent of ethylene oxide adduct of acetylene glycol-type,

B-2: Surface active agent of ethylene oxide—propylene oxide—ethylene oxide-type, and B-3: Ethylene oxide adduct of higher alcohol.

Compound Group C:

C-1: A compound represented by the formula

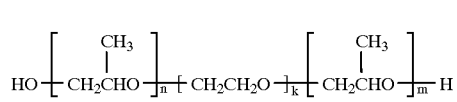

wherein k is an integer of 3 to 50, m is an integer of 3 to 25, n is an integer of 3 to 25, and n+m is an integer of 6 to 50, and C-2: A compound represented by the formula

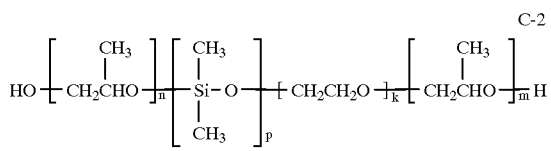

wherein k is an integer of 20 to 50, m is an integer of 10 to 25, n is an integer of 10 to 25, n+m is an integer of 20 to 50, and p is an integer of 2 to 5.

According to the present invention there is also provided a color ink-jet recording method for conducting color recording using the aforementioned ink.

According to the present invention, there is provided an ink which does not easily allow for trouble within a color ink-jet recording apparatus such as a foaming-up of ink or an air inclusion in the ink, and therefore, to provide an ink which can be supplied stably to nozzles, further which has a good balance between penetration into the recording paper and feathering, which has stable ejection properties so as to allow to form stably a formation of droplets even when dealing with a small droplet formation, moreover which does not easily cause clogging of nozzles, and thus which is capable of performing a high-quality recording, as well as a color ink-jet recording method which is not only capable of providing high-quality color images, but also has excellent reliability.

DESCRIPTION OF THE PREFERRED EMBODIMENTS

A further and more detailed description of the present invention will now be given with reference to embodiments thereof. The ink of the present invention comprises, compositionally, a water-soluble dye, water, at least one compound selected from the aforementioned Compound Group A and Compound Group B, and at least one compound selected from the aforementioned Compound Group C, and, physically, has a surface tension of not less than 30 mN/m and a viscosity of not more than 5 mpa•s. Now, the main characteristic components of the present invention will be described below.

1. Compound Group A:

A compound belonging to Compound Group A has a high compatibility with water, and a solution containing the compound of 6% by weight or more has a quick penetration is appropriate for color recording, is low in volatility and low in viscosity, has a high flash point, and is good in dye solubility as well. However, if the compound is contained more than 20% by weight in the ink, an undesirable marked seepage of the ink will result to the reverse side of the paper, when paper is used as a recording medium. A necessary and sufficient amount of the compound in Compound Group A in the present invention is within the range of from 6 to 12% by weight in the total weight of the ink.

The compounds belonging to Compound Group A have alkyl groups connected via ether bonds on the ends of the molecules, and are substances which maintain a certain level of hydrophobic properties with decreasing of viscosity and also have surfactant properties while being solvents. This is the reason why such substances are appropriate for a quick permeation of ink.

The present inventors have found that desirable properties for the inks of the present invention can be obtained when a substance exhibiting an adhesive tension of not more than −20 mN/m is used under these measurement conditions.

2. Compound Group B (1) B-1: Ethylene oxide adduct of acetylene glycol

The substance used here is an compound in which ethylene oxide of 3.5 to 20 mol on average is added to 1 mol of acetylene glycol. Commercially available compounds include: SURFINOL 440 (3.5 mol added), SURFINOL 465 (10 mol added) (both trade names, available from NISSHIN KAGAKU CO., LTD.), ACETYNOL EH (10 mol added) (trade name, manufactured by KAWAKEN FINE CHEMICAL CO., LTD.), and the like. Also, 5 mol, 15 mol, and 20 mol adducts are capable of providing a high degree of penetration.

(2) B-2: Surface active agent of ethylene oxide—propylene oxide—ethylene,

These are known as nonionic surface active agents. Of these, strongly hydrophobic substances with an HLB range of from 4 to 8 are preferably used in the present invention.

(3) B-3: Ethylene oxide adduct of higher alcohol

These are known as nonionic surface active agents. Of these, strongly hydrophobic substances with an HLB range of from 4 to 8 are preferably used in the present invention.

Quick penetration of ink to plain paper can be obtained by using any one of substances selected from the group consisting of the above B-1, B-2 and B-3 above in the ink of the present invention in an amount of from 0.3 to 3.0% by weight, or preferably, from 0.5 to 1.0% by weight.

3. Compound Group C

The compounds of Compound Group C do not have so high compatibility with water, but have a function to provide the ink with a foaming-resistant property and a foam-removing property. These compounds are particularly preferably used concurrently with a compound of Compound Group A. That is because the substances of Compound Group A increase the solubility of the substances of Compound Group C, thereby efficiently manifesting the foaming-resistant functions thereof.

(1) The compound C-1 is of the general formula

the structural feature of which is that at both ends of the molecule propylene glycol is bonded, and the middle portion of the molecule is of an ethylene glycol structure. Due to such a structure, this compound is considered to maintain a certain level of hydrophobic property within an aqueous medium, while the hydrophobic atom groups (propylene glycol) at both ends decrease a surface tension of the aqueous medium, thereby providing an ink with a foaming-resistant property.

As to silicone-type foam-removing agents which have silicone structures at the end of the molecule, there have been developed many substances, but these become emulsified and dispersed in an aqueous medium, and become inhomogeneous. While such silicone-type foam-removing agents have excellent properties as a foam-removing agent, the long-term stability thereof is poor, the surface tension reaches a value of 30 mN/m or lower so that it is difficult to form droplets, and low in the meniscus maintainability. Thus, it is inappropriate for a foam-removing agent.

A preferable compound regarding the substance in the aforementioned formula C-1 is such with HLB in the range of 4 to 10, a liquid oligomer with a molecular weight in the range of 400 to 5,000, wherein k is 3 to 50, m is 3 to 25, n is 3 to 25, and n+m is 6 to 50.

(2) The compound C-2 is of the general formula

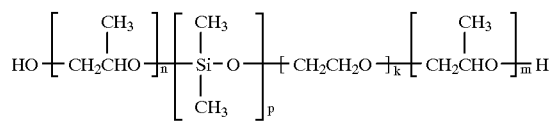

The Compound C-2 in the above formula is a substance having alkyl silicone diol units so as to increase the foaming-resistant and foam-removing properties as compared to that of C-1, with an HLB value in a range of from 4 to 10, being a liquid oligomer with a molecular weight in a range of from 400 to 5,000, wherein k is an integer of 20 to 50, m is an integer of 10 to 25, n is an integer of 10 to 25, n+m is an integer of 20 to 50, and p is an integer of 2 to 5.

In the ink of the present invention, either C-1 or C-2 is used in an amount, generally, within a range of 0.5 to 5.0% by weight, and more preferably 1.1 to 2.0% by weight, although it differs depending on the ink media employed. A specific amount of the compound to be added differs depending on the ink media employed, but should be added within a compatible range.

The compounds in Compound Group C exhibit a surface active property in the ink of the present invention, and the foaming-resistant and foam-removing properties thereof allow formation of stable droplets and reduction of air inclusion at the time of filling ink. A characteristic point thereof is that the compound belonging to the Compound Group C is completely dissolved in the ink, so that the surface tension of the ink is not dramatically reduced, and that surface tension of not less than 30 mN/m, which is one of the requirements of the ink of the present invention, can be maintained.

4. Colorants (dyes)

The colorant used in the present invention is a water-soluble dye. Any known dye so long as it is a water-soluble dye for use in water-based ink-jet ink may be used in the present invention.

Examples of water-soluble dyes preferably used in the ink according to the present invention are shown below. These dyes are belonging to a group of substances which are clear in color tone and dissolved stably in an ink medium and have been selected for the sake of recording images exhibiting an excellent color tone when recorded on paper and a good water-fastness on a recorded material. Specifically, the following are exemplified, but the present invention is by no means limited to these. Also, the water-solubilizing groups in the exemplified dyes may be each in free acidic states, alkali metal salts, ammonium salts, or organic amine salts.

Magenta dye (1)

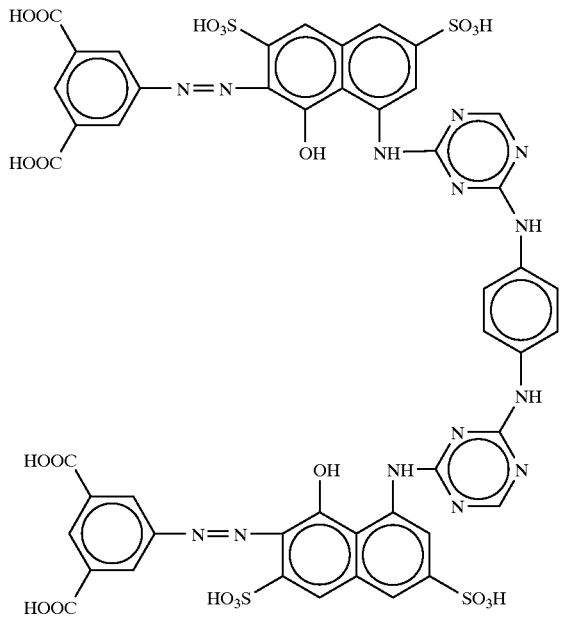

Magenta dye (2)

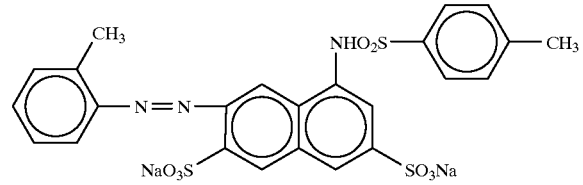

-continued
Magenta dye (3)
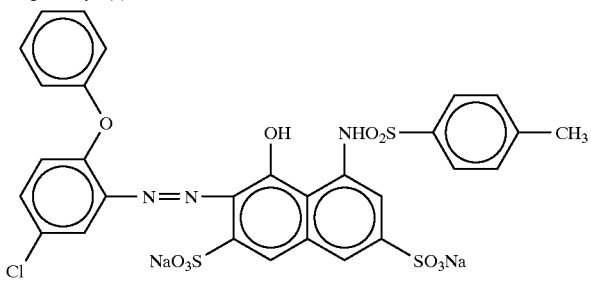
Magenta dye (4)
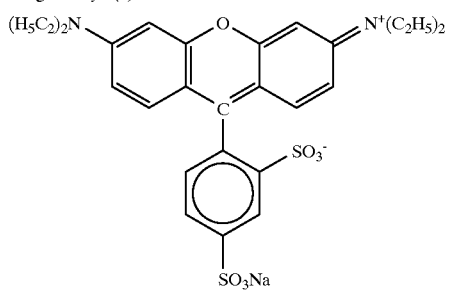
Yellow dye (1)
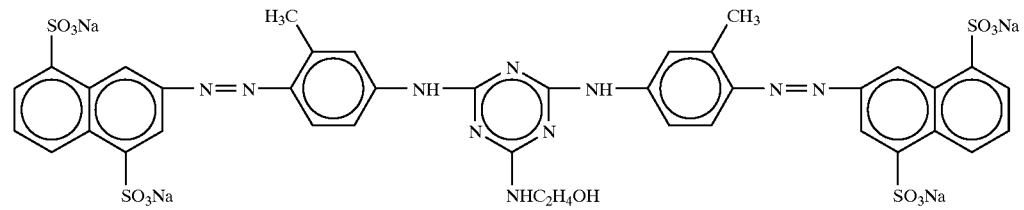
Yellow dye (2)
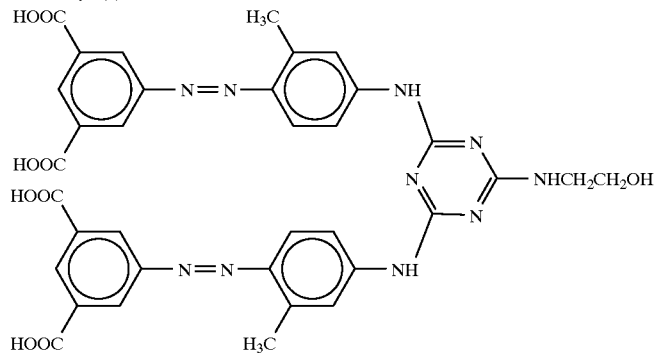
Yellow dye (3)
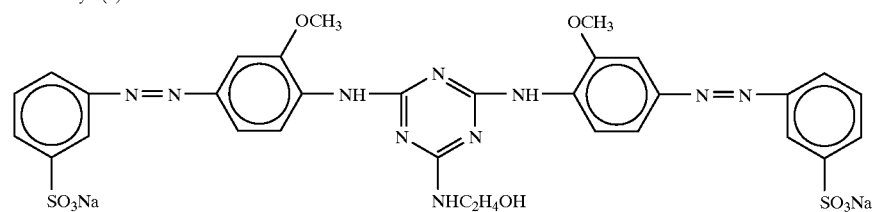

-continued
Yellow dye (4)
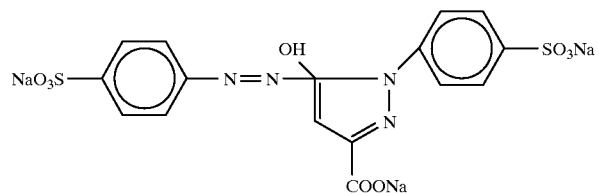
Cyan dye (1)
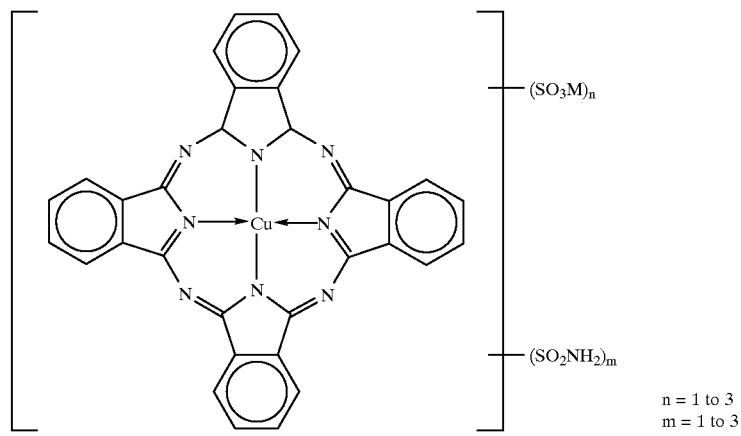
n = 1 to 3
m = 1 to 3
Cyan dye (2)
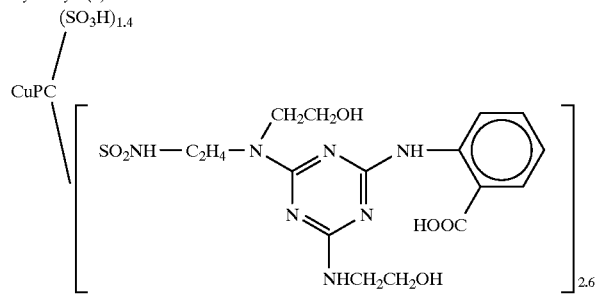
Cyan dye (3): ABL-9, Triphenyl methane type
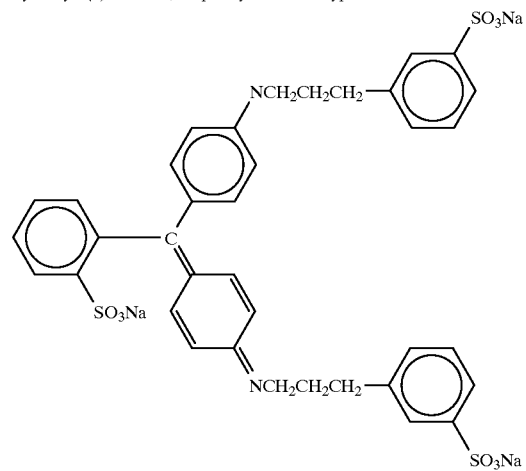

Black dye (1)

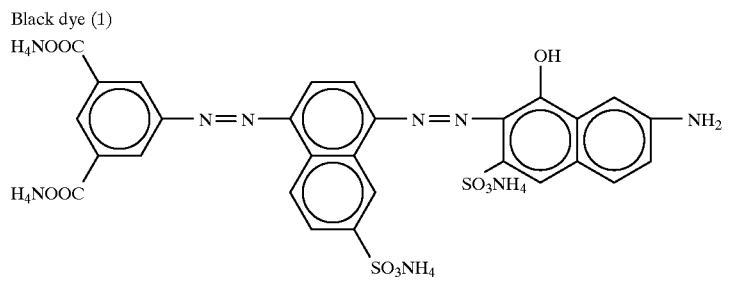

Black dye (2)

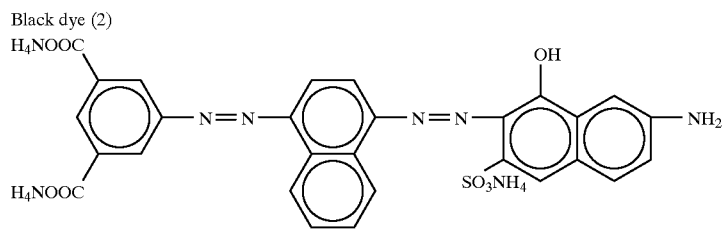

Black dye (3)

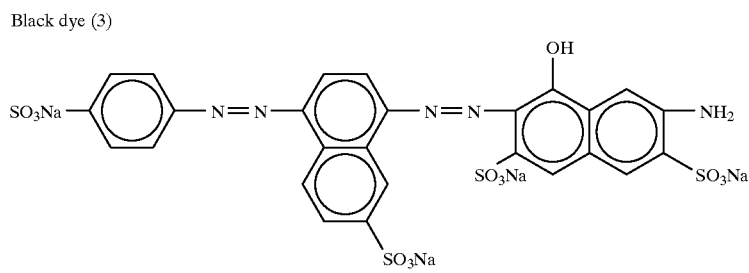

Black dye (4)

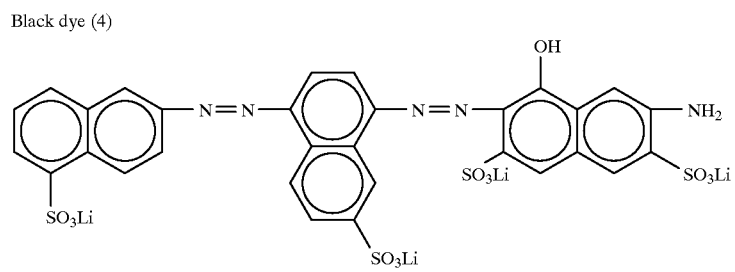

Black dye (5)

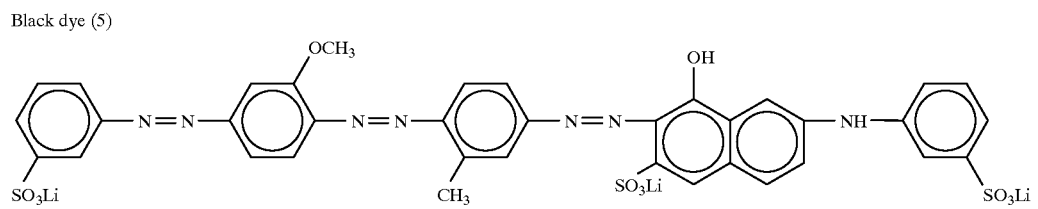

While the aforementioned dyes are compounds which are appropriate for an ink for an ink-jet recording method, it is needless to say that appropriate dyes may be selected from water-soluble dyes other than these such as acid dyes or direct dyes. The amount of such water-soluble dyes to be used is approximately 0.5 to 5.0% by weight based on the total weight of an ink.

5. Liquid medium for ink

The liquid medium of the ink is described below. Although water alone may be used as the liquid medium for the ink of the present invention, it is preferable to add water-miscible organic solvents with a high moisture-maintaining property for obtaining a more reliable ink. Specifically, examples of such include the following: ethylene glycol, diethylene glycol, triethylene glycol, tripropylene glycol, glycerin, 1,2,4-butane triol, 1,2,6-hexane triol, 1,2,5-pentane triol, 1,2-butane diol, 1,3-butane diol, 1,4-butane diol, dimethyl sulfoxide, diacetone alcohol, glycerin monoallyl ether, propylene glycol, butylene glycol, polyethylene glycol 300, tiodiglycol, N-methyl-2-pyrrolidine, 2-pyrrolidine, γ-butyro lactone, 1,3-dimethyl-2-imidazolidinone, sulfolane, trimethylol propane, trimethylol ethane, neopentyl glycol, ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, triethylene glycol monomethyl ether, triethylene glycol monoethyl ether, propylene glycol monomethyl ether, dipropylene glycol monomethyl ether, bis β-hydroxyethyl sulfone, bis P-hydroxyethyl urea, urea, acetonyl acetone, pentaerythritol, 1,4-cyclohexane diol, and the like. These water-soluble organic solvents are preferably used at a ratio of 5 to 50 parts by weight to 100 parts by weight of water.

6. pH adjusting agents

A pH value of the ink of the present invention should preferably be adjusted so as to be neutral to basic, owing to properties of the water-soluble dye to be used, from the view point of stability of the ink. Specific examples of pH adjusting agents to be used for this purpose include the following: organic bases such as ethanolamine, diethanolamine, triethanolamine, N-methyl ethanolamine, N-ethyl diethanolamine, 2-amino-2-methyl propanol, 2-ethyl-2-amino-1,3-propane diol, 2-(2-amino ether) ethanolamine, tris(hydroxy methyl) amino methane, ammonia, glycine, glycyl glycine, histidine, L-lysine, L-arginine, piperidine, morpholine, bis β-hydroxyethyl urea, and the like; and bases such as sodium hydroxide, potassium hydroxide, lithium hydroxide, and the like. It is possible to provide an ink with a pH stability by means of a pH buffer agent. Of these bases, alcohol amine is particularly preferable for obtaining storability of the ink and a good ejection stability of the ink when used in an ink-jet recording apparatus.

7. Adjustment of the ink

The ink according to the present invention is adjusted as follows.

The ink according to the present invention is adjusted so as to have a surface tension of not less than 30 mN/m, preferably from 35 to 45 mN/m, and a viscosity of not more than 5 mPa·s, preferably from 2 to 4 mPa·s. In order to obtain such physical properties, the mixture must include substance selected from Compound Group A in an amount of from 6% to 15% by weight, and substance selected from Compound Group B in an amount of from 0.5% to 5% by weight. Regarding a range of selecting ink-materials and a physical property range, the above physical property range must take precedence.

While the ink according to the present invention can be used favorably with ink-jet recording apparatus, it is needless to say that the ink according to the present invention is not limited to such, but may be applied to other monocolor ink-jet recording systems and other recording systems.

8. Method of conducting color ink-jet recording

Next, the method of conducting color ink-jet recording according to the present invention will be described.

The ink according to the present invention is optimally designed for on-demand type high-quality ink-jet printers. The basic configuration of such a printer is an apparatus with a multi-nozzle recording head having piezoelectric devices or thermal emitting devices, in which recording is conducted at a nozzle density of not less than 180 dpi (dots per inch), a droplet volume of from 3 to 50 pl, more preferably from 10 to 20 pl (pico-liter) and at a recording density of not less than 300 lpi (lines per inch). Also, the ink according to the present invention is suitable for recording apparatus of such a type where the ink tank alone is replaced when the ink has been spent.

Next, the present invention will be described in further detail with reference to Examples and Comparative Examples. In the following Examples and Comparative Examples, the terms "parts" and "%" respectively refer to "parts by weight" and "% by weight", unless otherwise specified.

EXAMPLE 1

| | |
|---|---|
| Ammonium salt of Black dye (1) | 3 parts |
| Compound A-9 | 10 parts |
| (Adduct product of 2 mol of ethylene oxide to 1 mol of benzyl alcohol) | |
| Compound C-1 | 4 parts |
| (50% isopropyl alcohol solution of a liquid compound of the formula | |

$$HO \left[ \begin{array}{c} CH_3 \\ | \\ CH_2CHO \end{array} \right]_n \left[ CH_2CH_2O \right]_k \left[ \begin{array}{c} CH_3 \\ | \\ CH_2CHO \end{array} \right]_m H$$

| | |
|---|---|
| wherein n + m = 16, k = 12, molecular weight is ca. 1,450, HLB = 7.3 (calculated value)) | |
| Ethylene glycol | 10 parts |
| Tris(hydroxymethyl)amino methane (pH adjuster) | 1 part |
| Water | 72 parts |

The above ingredients were well stirred and mixed, and filtered through a membrane filter having a pore size of 0.2 μm under pressure, thereby obtaining Black ink GEI-1B according to the present Example, having pH of 8.3, surface tension of 42.0 mN/m, and viscosity of 2.2 mpa·s. Further, cyan (GEI-1C), magenta (GEI-1M), and yellow (GEI-1Y) inks were prepared in the same way, except that the dye thereof was replaced with those described in Table 1.

TABLE 1

| Name of ink | Dye | Viscosity (mPa.s) | Surface tension (mN/m) |
|---|---|---|---|
| GEI-1C | Cyan dye (2) | 2.2 | 41.0 |
| GEI-1M | Magenta dye (1) | 2.3 | 43.0 |
| GEI-1Y | Yellow dye (2) | 2.15 | 40.0 |

EXAMPLE 2

| | |
|---|---|
| Ammonium salt of Cyan dye (2) | 2.8 parts |
| Compound A-8 | 8 parts |
| (dipropylene glycol monopropyl ether) | |
| Compound C-1 | 4 parts |
| (50% ethyl alcohol solution of a liquid compound of the formula | |

$$HO \left[ \begin{array}{c} CH_3 \\ | \\ CH_2CHO \end{array} \right]_n \left[ CH_2CH_2O \right]_k \left[ \begin{array}{c} CH_3 \\ | \\ CH_2CHO \end{array} \right]_m H$$

| | |
|---|---|
| wherein n + m = 30, k = 25, molecular weight is ca. 2,850, HLB = 7.7 (calculated value)) | |
| Diethylene glycol | 13 parts |
| Ammonium sulfate (pH adjuster) | 1 part |
| Water | 71.2 parts |

The above ingredients were well stirred and mixed, and filtered through a membrane filter having a pore size of 0.2 μm under pressure, thereby obtaining Cyan ink GEI-2C according to the present Example, having pH of 8.5, surface tension of 36.0 mN/m, and viscosity of 2.5 mpa·s. Further, magenta (GEI-2M), yellow (GEI-2Y), and black (GEI-2B) inks were prepared in the same way, except that the dye thereof was replaced with those described in Table 2.

TABLE 2

| Name of ink | Dye | Viscosity (mPa.s) | Surface tension (mN/m) |
| --- | --- | --- | --- |
| GEI-2M | Magenta dye (1) | 2.3 | 37.5 |
| GEI-2Y | Yellow dye (2) | 2.3 | 37.4 |
| GEI-2B | Black dye (2) | 2.1 | 38.0 |

EXAMPLE 3

| | |
| --- | --- |
| Ammonium salt of Magenta dye (1) | 2.8 parts |
| Compound A-7 (triethylene glycol n-butyl ether) | 6 parts |
| Compound C-2 (50% methanol solution of a compound of the formula | 4 parts |

$$HO\left[CH_2CHO\atop CH_3\right]_n\left[Si(CH_3)_2-O\right]_p\left[CH_2CH_2O\right]_k\left[CH_2CHO\atop CH_3\right]_m H$$

wherein n + m = 20, p = 5, k = 20, and molecular weight is ca. 2,500)

| | |
| --- | --- |
| Diethylene glycol | 15 parts |
| Triethanol amine (pH adjuster) | 1 part |
| Water | 72.2 parts |

The above ingredients were well stirred and mixed, and filtered through a membrane filter having a pore size of 0.2 μm under pressure, thereby obtaining Magenta ink GEI-3M according to the present Example, having pH of 9.0, surface tension of 40.0 mN/m, and viscosity of 2.1 mpa•s. Further, black (GEI-3B), cyan (GEI-3C), and yellow (GEI-3Y) inks were prepared in the same way, except that the dye thereof was replaced with those described in Table 3.

TABLE 3

| Name of ink | Dye | Viscosity (mPa.s) | Surface tension (mN/m) |
| --- | --- | --- | --- |
| GEI-3B | Black dye (2) | 2.2 | 39.3 |
| GEI-3C | Cyan dye (1) | 2.4 | 39.5 |
| GEI-3Y | Yellow dye (4) | 2.2 | 40.2 |

EXAMPLE 4

| | |
| --- | --- |
| Ammonium salt of Yellow dye (2) | 2.8 parts |
| Compound A-2 (SURFINOL 465) | 1.5 parts |
| Compound C-2 (20% methanol solution of a compound of the formula | 5 parts |

$$HO\left[CH_2CHO\atop CH_3\right]_n\left[Si(CH_3)_2-O\right]_p\left[CH_2CH_2O\right]_k\left[CH_2CHO\atop CH_3\right]_m H$$

wherein n + m = 50, p = 3, k = 30, and molecular weight is ca. 4,500)

| | |
| --- | --- |
| Glycerin | 8 parts |
| Diethylene glycol | 15 parts |
| Triethanol amine (pH adjuster) | 1 part |
| Water | 72.2 parts |

The above ingredients were well stirred and mixed, and filtered through a membrane filter having a pore size of 0.2 μm under pressure, thereby obtaining Yellow ink GEI-4Y according to the present Example, having pH of 9.2, surface tension of 35.0 mN/m, and viscosity of 2.7 mpa•s. Further, black (GEI-4B), magenta (GEI-4M), and cyan (GEI-4C) inks were prepared in the same way, except that the dye thereof was replaced with those described in Table 4.

TABLE 4

| Name of ink | Dye | Viscosity (mPa.s) | Surface tension (mN/m) |
|---|---|---|---|
| GEI-4B | Black dye (4) | 2.6 | 35.2 |
| GEI-4M | Magenta dye (4) | 2.7 | 36.5 |
| GEI-4C | Cyan dye (2) | 2.6 | 36.0 |

EXAMPLE 5

| | |
|---|---|
| Ammonium salt of Black dye (2) | 2.8 parts |
| Compound A-8 | 10 parts |
| (dipropylene glycol monopropyl ether) | |
| Compound B-2 | 2 parts |
| (Surface active agent of ethylene oxide - propylene oxide - ethylene oxide-type, with HLB = 8 and molecular weight of 2,500) | |
| Compound C-1 | 4 parts |
| (50% ethyl alcohol solution of a compound of the formula | |

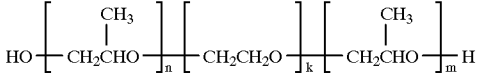

wherein n + m = 30, k = 25, molecular weight ca. 2,850, HLB = 7.7 (calculated value))
| Diethylene glycol | 5 parts |
| Glycerin | 10 parts |
| Lithium hydroxide (pH adjuster) | 0.3 parts |
| Water | 72.2 parts |

The above ingredients were well stirred and mixed, and filtered through a membrane filter having a pore size of 0.2 μm under pressure, thereby obtaining Black ink GEI-5B according to the present Example, having pH of 9.5, surface tension of 38.0 mN/m, and viscosity of 3.0 mpa•s. Further, cyan (GEI-5C), magenta (GEI-5M), and yellow (GEI-5Y) inks were prepared in the same way, except that the dye thereof was replaced with those described in Table 5.

TABLE 5

| Name of ink | Dye | Viscosity (mPa.s) | Surface tension (mN/m) |
|---|---|---|---|
| GEI-5C | Cyan dye (2) | 2.9 | 37.5 |
| GEI-5M | Magenta dye (2) | 2.8 | 38.0 |
| GEI-5Y | Yellow dye (2) | 2.9 | 39.0 |

COMPARATIVE EXAMPLE 1

Ink SFI-1B of Comparative Example 1 the penetration of which is increased by means of a surface active agent was prepared with the following ingredients:

| | |
|---|---|
| Ammonium salt of Black dye (1) | 3 parts |
| Ethylene oxide adduct of nonyl phenol | 1 part |
| (HLB = 10, manufactured by SANNOPCO CO., LTD.) | |
| Urea | 7.5 parts |
| Diethylene glycol | 12.5 parts |
| Tris(hydroxymethyl) amino methane | 1 part |
| (pH adjuster) | |
| Water | 75 parts |

The above ingredients were well stirred and mixed, and filtered through a membrane filter having a pore size of 0.2 μm under pressure, thereby obtaining Black ink SFI-1B of Comparative Example 1, having pH of 8.0, surface tension of 30.0 mN/m, and viscosity of 2.5 mpa•s.

COMPARATIVE EXAMPLE 2

Ink SFDFI-2B of Comparative Example 2 in which silicone foaming-resistant agent is added for retarding foaming was prepared with the following ingredients:

| | |
|---|---|
| Ammonium salt of Black dye (1) | 3 parts |
| Ethylene oxide adduct of nonyl phenol | 1 part |
| (HLB = 10, manufactured by SANNOPCO CO., LTD.) | |
| Urea | 7.5 parts |
| Diethylene glycol | 12.5 parts |
| Tris(hydroxy methyl) amino methane | 1 part |
| (pH adjuster) | |
| Co-polymer of silicone diol and ethylene oxide (foam-removing agent) | 2 parts |
| Water | 73 parts |

The above ingredients were well stirred in a homogenizer at 100 rpm for 15 minutes, and filtered through a membrane filter having a pore size of 0.2 μm under pressure, thereby obtaining Black ink SFDFI-2B of Comparative Example 2, having pH of 8.0, surface tension of 26.5 mN/m, and viscosity of 2.6 mpa•s. This ink was in a state where the foaming-resistant agent was more emulsified, and the solution was somewhat lacking in transparency.

COMPARATIVE EXAMPLE 3

Black ink CSFI-3B of Comparative Example 3 was obtained in the same way as with Example 1, except for reducing the amount of Compound A-9 (Ethylene oxide 2 mol adduct of benzyl alcohol) from 10 parts to 4 parts, and adding diethylene glycol instead. The viscosity of this ink was 2.55 mpa•s, and the surface tension was 44.0 mN/m.
Printing test:

The following tests were conducted for the inks of Examples 1 to 5 and Comparative Examples 1 to 3, using a test bubble jet color printer having 128 nozzles, nozzle density of 720 dpi, main scanning and sub-scanning print density 720 lpi, driving speed of 8 kHz, and average droplet volume of 10 pl, and using paper for electrophotography (plain-paper).

1. Ejection properties—droplet formation

An apparatus which can monitor the form (volume) of droplets being ejected from the nozzle was used to measure the average value of the droplet volume.
(Evaluation standards)
A: Main droplets of approximately 10 pl were ejected.
B: 2 droplets having a volume smaller than 10 pl were ejected.
C: The ink was not forming droplets, being ejected in the form of liquid columns.
D: Many small droplets were being ejected disruptedly.

2. Ink tank replacement test

All the ink in an ink tank was used, a new ink tank of the same ink color was mounted, suction was conducted from the nozzle side using a recovery pump, and the head was filled with the new ink. Subsequently, continuous solid printing was conducted until the ink was spent.

(Evaluation standards)

A: Printing was conducted for the normal number of pages, without problem.

B: Ink stopped once during the operation, but returned to normal conditions with a recovery operation.

C: Ink stopped often, and pump suction operations were conducted frequently. There were observed many small bubbles in the ink chamber after the test, but there was no damage to the heater.

D: Ink stopped entirely, the print density became light, and printing could not be continued even after recovery operations were conducted. There were observed many small bubbles in the ink chamber after the test, and damage to the heater was also observed.

3. Print suitability—drying property

Test patterns with a text and monocolor patches arrayed were recorded on the aforementioned plain paper, and the time required for drying was measured.

(Evaluation standards)

A: The print was dry when paper is discharged from the printer.

B: The print dried in several seconds after paper is discharged.

C: The print dried in several ten seconds after paper is discharged.

4. Print quality—Border bleeding

The borders between the color patches and the characters of the printed material obtained in "3. Print suitability—driability" was examined for bleeding.

(Evaluation standards)

A: No border bleeding could be discerned by eye.

B: Some border bleeding occurred between the yellow and black.

C: The characters were somewhat thicker, and border bleeding was marked.

In the case of the test for the inks of Comparative Examples, the color inks of Example 1 were used, except for the black ink.

Test results:

The evaluation results of each of the items of the aforementioned printing tests were shown in Table 6.

TABLE 6

Evaluation results of Examples 1 to 5 and Comparative Examples 1 to 3.

|  | 1. Ejection properties—droplet formation | 2. Ink tank replacement test | 3. Print suitability—drying property | 4. Print quality—Border bleeding |
|---|---|---|---|---|
| Example 1 | A | A | A | A |
| Example 2 | A | A | A | A |
| Example 3 | A | A | A | A |
| Example 4 | A | A | A | A |
| Example 5 | A | A | A | A |
| Comparative Example 1 | B | C | A | B |
| Comparative Example 2 | C | A | B | C |
| Comparative Example 3 | A | C | B | C |

Thus, as described above, according to the present invention, there can be provided a novel ink which does not easily allow for trouble within a color ink-jet recording apparatus such as foaming-up of ink or an air inclusion in the ink, and therefore, there can be provided an ink which can be supplied stably to the nozzles, which ink further has a good balance between penetration into the recording paper and bleeding, which has stable ejection properties so as to allow for stable formation of droplets even when dealing with small droplet formation, and moreover which does not easily cause clogging, thus allowing for high-quality recording, and at the same time, providing a color ink-jet recording system which also has excellent reliability.

Also, inexpensive and high-quality images can be realized in the office by means of employing the ink of the present invention, and thus is meaningful to widespread general use of digital printing technology.

Moreover, by means of using the ink of the present invention in ink-jet recording apparatuses effects can be obtained such as: stable droplet formation can be maintained without separating into smaller droplets, a phenomena called splashing, and ejecting can be conducted for long periods of time; the penetration-fixing time is short, coloring is good, bleeding is minimal, thus providing a clear image, even when plain paper is used; and further, when used in an ink-jet recording apparatus which allows for the ink tank alone to be replaced, there is little air taken in or foaming in the ink even when replacing the ink tank, so that the ink path is properly filled with ink.

What is claimed is:

1. An ink, having a surface tension of not less than 30 mN/m and a viscosity of not more than 5 mPa·s, and comprising a water-soluble dye, water, at least one compound selected from the Compound Groups A and B, and a compound represented by the formula C-2:

Compound Group A:

A-1: Ethylene glycol mono-n-butyl ether,
A-2: Ethylene glycol monophenyl ether,
A-3: Ethylene glycol monoisobutyl ether,
A-4: Diethylene glycol mono-n-butyl ether,
A-5: Diethylene glycol monohexyl ether,
A-6: Diethylene glycol monoisobutyl ether,
A-7: Triethylene glycol n-butyl ether,
A-8: Dipropylene glycol monopropyl ether, and
A-9: Ethylene oxide adduct of benzyl alcohol;

Compound B:

B-1: Surface active agent of ethylene oxide adduct of acetylene glycol-type,
B-2: Surface active agent of ethylene oxide—propylene oxide—ethylene oxide-type, and
B-3: Ethylene oxide adduct of higher alcohol; and C-2: A compound of the formula

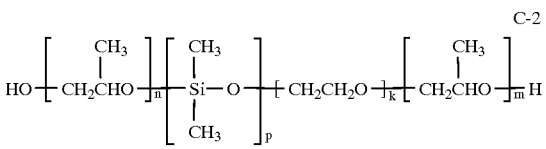

wherein k is an integer of 20 to 50, m is an integer of 10 to 25, n is an integer of 10 to 25, n+m is an integer of 20 to 50, and p is an integer of 2 to 5.

2. The ink according to claim 1, wherein a compound of Compound Group A is present in an amount of from 6 to 12% by weight based on the total weight of said ink.

3. The ink according to claim 1, wherein a compound of Compound Group B is present in an amount of from 0.3 to 3.0% by weight based on the total weight of said ink.

4. The ink according to claim 1, wherein the compound of formula C-2 is present in an amount of from 0.5 to 5.0% by weight based on the total weight of said ink.

5. The ink according to claim 1, wherein said water-soluble dye is present in an amount of from 0.5 to 5.0% by weight based on the total weight of said ink.

6. The ink according to claim 1, which further comprises water-soluble organic solvent.

7. The ink according to claim 1, wherein said water-soluble dye is a magenta dye.

8. The ink according to claim 1, wherein said water-soluble dye is a yellow dye.

9. The ink according to claim 1, wherein said water-soluble dye is a cyan dye.

10. The ink according to claim 1, wherein said water-soluble dye is a black dye.

11. A color ink-jet recording method for conducting a color recording by applying respective ink droplets which are made from using magenta, yellow, cyan, and black inks by means of an ink-jet system, wherein said inks are each an ink according to claim 1.

12. An ink-jet recording process comprising the steps of:
providing an ink-jet printer provided with a recording head which ejects an ink droplet whose volume is from 10 to 20 picoliters, and
ejecting an ink with the ink-jet printer towards a recording medium and forming an image on the surface of the recording medium,
wherein the ink has a surface tension of not less than 30 mN/m and a viscosity of not more than 5 mPa•s, and comprises a water-soluble dye, water, at least one compound selected from the Compound Groups A and B, and a compound represented by the formula C-2:

Compound Group A:
A-1: Ethylene glycol mono-n-butyl ether,
A-2: Ethylene glycol monophenyl ether,
A-3: Ethylene glycol monoisobutyl ether,
A-4: Diethylene glycol mono-n-butyl ether,
A-5: Diethylene glycol monohexyl ether,
A-6: Diethylene glycol monoisobutyl ether,
A-7: Triethylene glycol n-butyl ether,
A-8: Dipropylene glycol monopropyl ether, and
A-9: Ethylene oxide adduct of benzyl alcohol;
Compound B:
B-1: Surface active agent of ethylene oxide adduct of acetylene glycol-type,
B-2: Surface active agent of ethylene oxide—propylene oxide—ethylene oxide-type, and
B-3: Ethylene oxide adduct of higher alcohol; and
C-2: A compound of the formula

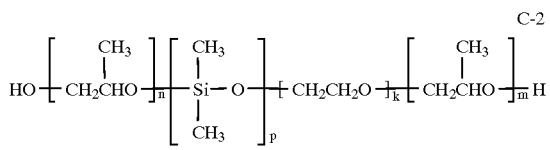

wherein k is an integer of 20 to 50, m is an integer of 10 to 25, n is an integer of 10 to 25, n+m is an integer of 20 to 50, and p is an integer of 2 to 5.

13. An ink tank that is detachable from a recording head of an ink-jet printer, containing an ink, wherein the ink has a surface tension of not less than 30 mN/m and a viscosity of not more than 5 mPa•s, and comprises a water-soluble dye, water, at least one compound selected from the Compound Groups A and B, and a compound represented by the formula C-2:

Compound Group A:
A-1: Ethylene glycol mono-n-butyl ether,
A-2: Ethylene glycol monophenyl ether,
A-3: Ethylene glycol monoisobutyl ether,
A-4: Diethylene glycol mono-n-butyl ether,
A-5: Diethylene glycol monohexyl ether,
A-6: Diethylene glycol monoisobutyl ether,
A-7: Triethylene glycol n-butyl ether,
A-8: Dipropylene glycol monopropyl ether, and
A-9: Ethylene oxide adduct of benzyl alcohol;
Compound B:
B-1: Surface active agent of ethylene oxide adduct of acetylene glycol-type,
B-2: Surface active agent of ethylene oxide—propylene oxide—ethylene oxide-type, and
B-3: Ethylene oxide adduct of higher alcohol; and
C-2: A compound of the formula

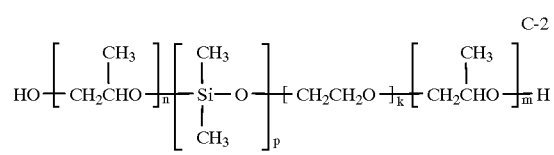

wherein k is an integer of 20 to 50, m is an integer of 10 to 25, n is an integer of 10 to 25, n+m is an integer of 20 to 50, and p is an integer of 2 to 5.

14. An ink-jet printer provided with a recording head and an ink tank, the recording head ejecting an ink droplet whose volume is from 10 to 20 picoliters, and the ink tank being detachable from the recording head and containing an ink to be ejected by the recording head,
wherein the ink has a surface tension of not less than 30 mN/m and a viscosity of not more than 5 mPa•s, and comprises a water-soluble dye, water, at least one compound selected from the Compound Groups A and B, and a compound represented by the formula C-2:

Compound Group A:
A-1: Ethylene glycol mono-n-butyl ether,
A-2: Ethylene glycol monophenyl ether,
A-3: Ethylene glycol monoisobutyl ether,
A-4: Diethylene glycol mono-n-butyl ether,
A-5: Diethylene glycol monohexyl ether,
A-6: Diethylene glycol monoisobutyl ether,
A-7: Triethylene glycol n-butyl ether,
A-8: Dipropylene glycol monopropyl ether, and
A-9: Ethylene oxide adduct of benzyl alcohol;
Compound B:
B-1: Surface active agent of ethylene oxide adduct of acetylene glycol-type,
B-2: Surface active agent of ethylene oxide—propylene oxide—ethylene oxide-type, and
B-3: Ethylene oxide adduct of higher alcohol; and
C-2: A compound of the formula

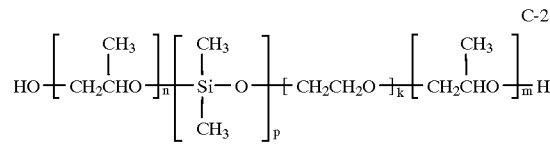

wherein k is an integer of 20 to 50, m is an integer of 10 to 25, n is an integer of 10 to 25, n+m is an integer of 20 to 50, and p is an integer of 2 to 5.

* * * * *

UNITED STATES PATENT AND TRADEMARK OFFICE
CERTIFICATE OF CORRECTION

PATENT NO. : 5,952,414

DATED : September 14, 1999

INVENTOR(S) : HIROMICHI NOGUCHI, ET AL.

Page 1 of 2

It is certified that error appears in the above-identified patent and that said Letters Patent is hereby corrected as shown below:

COLUMN 4:

Line 3, "an" should read --a--.
    Line 14, "ethylene," should read
--ethylene oxide-type.--.

COLUMN 6:

Line 2, "inclusion" should read --inclusions--.

COLUMN 12:

Line 55, "tiodiglycol" should read --thiodiglycol--.

COLUMN 14:

Line 26, "mpa•s." should read --mPa•s.--.
    Line 64, "mpa•s." should read --mPa•s.--.

COLUMN 15:

Line 34, "mpa•s." should read --mPa•s.--.

UNITED STATES PATENT AND TRADEMARK OFFICE
CERTIFICATE OF CORRECTION

PATENT NO. : 5,952,414

DATED : September 14, 1999

INVENTOR(S) : HIROMICHI NOGUCHI, ET AL.

It is certified that error appears in the above-identified patent and that said Letters Patent is hereby corrected as shown below:

COLUMN 17:

Line 5, "mpa•s." should read --mPa•s.--.
    Line 47, "mpa•s." should read --mPa•s.--.

COLUMN 18:

Line 15, "mpa•s." should read --mPa•s.--.
    Line 38, "mpa•s." should read --mPa•s.--.
    Line 48, "mpa•s," should read --mPa•s,--.

COLUMN 19:

Line 30, "ten" should read --tens of--.

Signed and Sealed this

Sixth Day of June, 2000

Attest:

Q. TODD DICKINSON

*Attesting Officer*      *Director of Patents and Trademarks*